United States Patent [19]

Tremel et al.

[11] Patent Number: 5,434,846
[45] Date of Patent: Jul. 18, 1995

[54] PROCESS AND APPARATUS FOR SUPERVISION AND/OR TESTING OF AN ATM-TYPE TELECOMMUNICATIONS NETWORK

[75] Inventors: Jean-Yves Tremel; Rene Garandel, both of Pleumeur Bodou, France

[73] Assignee: France Telecom, Paris, France

[21] Appl. No.: 274,015

[22] Filed: Jul. 12, 1994

[30] Foreign Application Priority Data

Jul. 12, 1993 [FR] France .................................. 93 08797

[51] Int. Cl.⁶ .............................................. H04L 1/24
[52] U.S. Cl. ...................................... 370/13; 370/94.1; 371/20.1; 371/49.1
[58] Field of Search ................... 371/15.1, 20.1, 20.4, 371/48, 49.1; 370/13, 17, 60, 94.1

[56] References Cited

U.S. PATENT DOCUMENTS

| | | | |
|---|---|---|---|
| 5,151,902 | 9/1992 | Grallert | 371/20.1 |
| 5,257,311 | 10/1993 | Naito et al. | 370/94.1 |
| 5,268,909 | 12/1993 | Loebig | 371/49.1 |
| 5,325,366 | 6/1994 | Shinbashi | 371/20.1 |
| 5,343,464 | 8/1994 | Sekihata et al. | 370/13 |

FOREIGN PATENT DOCUMENTS 0511671 4/1992 European Pat. Off. .

OTHER PUBLICATIONS

GLOBECOM '90, vol. 3, Dec. 1990, New York, U.S. pp. 1445–1449, O. Aboul-Magd, et al "Traffic Experimentation in ATM Testbed", Paragraphs 4.C and 4.D.
NTT Review, vol. 4, No. 4, 4 Jul. 1992, Tokyo, Japan pp. 38–44, H. Murakami, et al "Monitoring Method for Cell Transfer Performance in ATM Networks", entire document.

Primary Examiner—Benedict V. Safourek
Attorney, Agent, or Firm—Kerkam, Stowell, Kondracki & Clarke; Edward J. Kondracki

[57] ABSTRACT

A process for monitoring a network which conforms to an Asynchronous Transfer Mode process standard including reading conveyed cells at a point (P) in the network (R), performing a preprocessing step which includes reformatting cells that have been read, selecting cells that are useful for execution of testing operations, recalculating at least a portion of check information, and arranging the recalculated check information and the received check information into messages, processing the messages in order to verify the coherence between the recalculated check information and the received check information.

17 Claims, 3 Drawing Sheets

PROCESS AND APPARATUS FOR SUPERVISION AND/OR TESTING OF AN ATM-TYPE TELECOMMUNICATIONS NETWORK

FIELD OF THE INVENTION

The invention relates to a process for supervision and/or testing for a telecommunications network conforming to the ATM ("Asynchronous Transfer Mode") standard or an analogous standard. It also relates to an apparatus for implementing the process.

BACKGROUND

It will be recalled that transmissions of information in an-ATM network are accomplished by means of cells composed of a 5-byte header and a 48-byte data block. The format of such a cell is represented in FIG. 1. Certain specific cells, which are recognizable from specific values of certain fields of the header, are reserved for maintenance operations and are designated, in accordance with the ATM standard, as F4 or F5 maintenance cells. The content of these cells is developed by the manufacturers particularly in order to supply redundant information which pertains to a set of user cells that are intended to be sent. Thus, a transmission of information occurs in the form of a block which comprises a predetermined number of user cells, and these cells are transmitted in succession, followed by a maintenance cell associated with the block.

In addition to t]he maintenance cells, the ATM standard makes it possible to introduce cells of the redundant data into the interior itself, which allows the detection of errors in transmission. This will be the case when, for example, the cells are assigned to the transmission of communications protocols for Swapping with local networks.

The ATM standard also allows time-division multiplexing at several levels while organizing the flow of cells into virtual paths (VP) and virtual channels (VC). Thus, each ATM cell can be assigned to one virtual path VP among 4,096 and to one virtual channel VC among 65,536. The virtual channel and path numbers of the cell are contained respectively in the 12- and 16-bit fields of the header.

In accordance with these two levels of multiplexing, the standard provides for specific maintenance cells F4 and F5 that are respectively assigned to the virtual paths VP and the virtual channels VC. These maintenance cells make it possible to perform verifications of the quality of the transmission either at the level of the virtual paths, or at that of the virtual channels. For that purpose, they contain check information such as parity bits which are calculated from the data in the user cells of the associated block.

OBJECTS OF THE INVENTION

In this context, the object of the invention is to find a process for verifying proper functioning of the transmission of the cells by means of the check information mentioned above; this method must be designed in order to permit its implementation with a piece of equipment that is as simple as possible. In addition, the process must be easily adaptable to different tests, for example tests for verifying only the virtual paths, or certain selected virtual paths or certain particular virtual channels, or even for verifying the communication protocols.

To attain this object, the subject of the invention is a process for supervision and/or testing of a telecommunications network which conveys information in the form of cells which conform to the ATM ("Asynchronous Transfer Mode") standard or an analogous standard, the cells comprising a header that makes it possible to differentiate between user cells and maintenance cells, with check information being created during manufacture and being transmitted to the user cells and/or the maintenance cells that have been sent, the process being characterized in that it consists:

of reading the conveyed cells at a point in the network, of performing a preprocessing which consists of formatting the cells that have been read, selecting the usable cells through the execution of testing operations, recalculating at least a portion of the check information, and arranging the recalculated check information and the received check information into messages, the messages being intended to undergo a subsequent processing in order to verify, in particular, the coherence between the recalculated check information and the received check information.

According to another aspect of the invention, in the case in which the check information is contained in the maintenance cells, the messages may be messages of a first type in order to contain recalculated check information, or messages of a second type in order to contain the check information of the maintenance cells, the messages of the second type containing an indicator which permits them to be recognized as messages which relate to the maintenance cells.

In order to be able to perform supervision of the virtual paths, the invention according to a supplementary characteristic provides for the messages to contain the virtual path numbers; the subsequent processing, then, consists of associating each virtual path with a context in the form of a report which makes it possible to verify the coherence of the check information associated with this virtual path.

In order to be able to perform supervision of the network at the level of the virtual channels, the preceding solution would necessitate providing for a context for each virtual channel-virtual path pair. It would then be necessary for the equipment to support a number of contexts greater than 268 million. In order to limit this number while allowing testing of the virtual channels, the invention according to another characteristic provides for the selection of the cells to consist of associating corresponding fictive virtual path numbers with certain predetermined virtual paths and channels; the messages hen contain the fictive virtual path numbers, so that the subsequent processing consists of associating an associated context with each fictive virtual path.

On the other hand, it is known that transmissions of information in ATM networks are in the form of ATM-level cell blocks between each of which a maintenance cell is sent. When the quantity of information to be sent does not always correspond exactly to the capabilities of entire cell blocks, certain of the cells in certain blocks will contain empty cells, in other words cells that contain no information other than the indication that these cells are empty. These cells are in effect unusable from the maintenance point of view. Also, according to another aspect of the invention, the selection of cells consists in particular of eliminating these empty cells.

Another subject of the invention is a supervision apparatus for implementing the process. The apparatus is characterized in that it comprises:

a preprocessing unit which receives at its input the conveyed cells at a point in the network, and which is expected to format the received cells, to select the usable cells through the execution of testing operations, to recalculate at least a portion of the check information, and to form messages containing the recalculated check information and the received check information, and that the preprocessing unit communicates with a processing unit so as to transmit the messages to it.

According to another aspect of the apparatus, in the case in which the check information is contained in maintenance cells, the preprocessing unit forms messages of a first type in order to contain the recalculated check information and messages of a second type containing the information received from the maintenance cells, the messages of the second type containing an indicator which permits them to be recognized as messages which relate to the maintenance cells.

In order to allow supervision at the virtual channel level, the apparatus according to the invention is also characterized in that the preprocessing unit comprises a translation memory that is addressable as a function of the values of the virtual channel and path numbers received, and this memory provides each pair of virtual channel and path values with either a word representing a cell that has not been selected, or a word containing a value of a fictive path number corresponding to the pair of values, and that the processing unit is a unit that has been programmed so as to associate each fictive virtual path (VPF) with a memory space allocated to a context in the form of a report which makes it possible to verify the coherence between the recalculated check information and the check information contained in the cells belonging to the fictive virtual path (VPF).

BRIEF DESCRIPTION OF THE DRAWINGS

Other aspects and advantages of the invention will be apparent after the description which refers to the drawings.

DESCRIPTION OF THE PREFERRED EMBODIMENT

Figure 1:
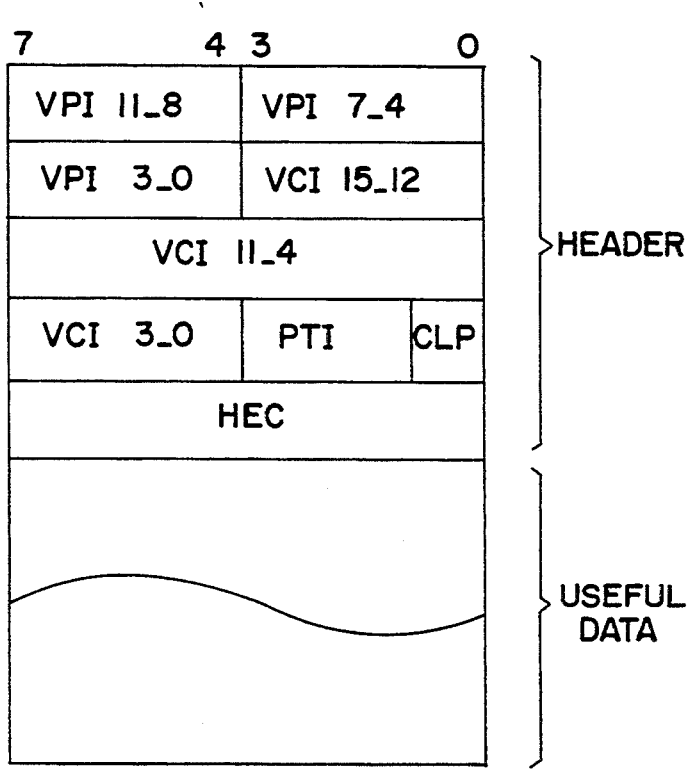
FIG. 1 represents the format of an ATM cell.

FIG. 1 represents the format of ATM cells. A 5-byte header whose bits are numbered from 0 to 7 contains the virtual path number VPI defined by 12 bits, the virtual channel number VCI defined by 16 bits, an indicator of the priority CLP defined by 1 bit, as well as an error correcting code HEC defined by 8 bits which pertains to the 4 preceding bytes.

The header is followed by 48 information bytes reserved for the useful data.

Figure 2:
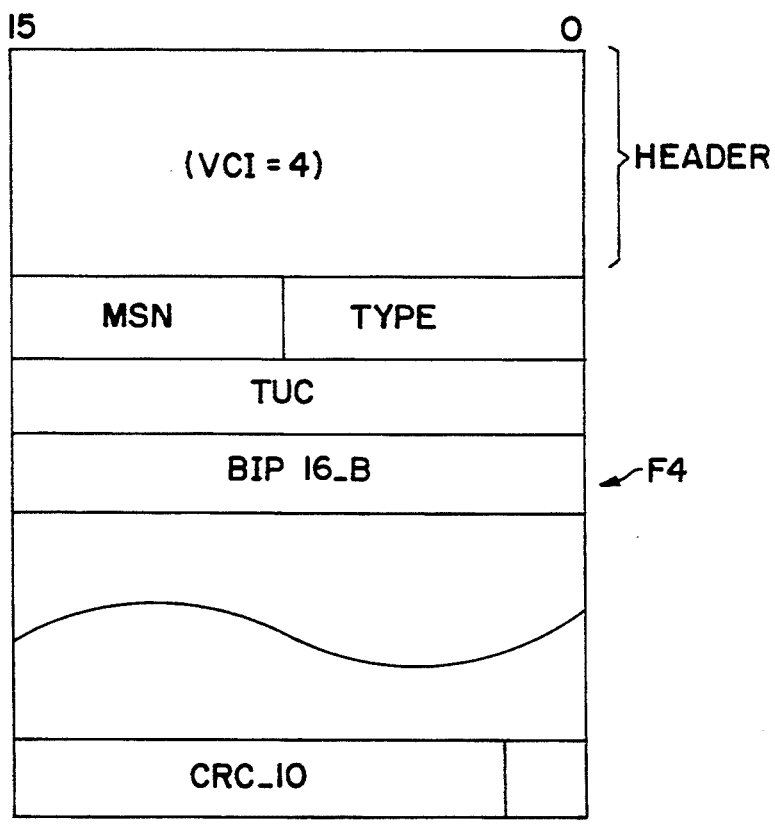
FIG. 2 represents the format of an F4-type maintenance cell.

FIG. 2 represents the format, in words of 16 bits each, of a maintenance cell of the F4 type. It is also composed of a header which comprises the same information as before. Conventionally, the virtual channel number is fixed at the value 4 so that the F4 cells may be differentiated from other cells.

In the usable part of the cell, there is in particular a sequence number MSN ("Monitoring Cell Sequence Number") defined by 8 bits which indicates modulo 256 as the sending sequence for the cell. The field TUC ("Total User Cell Number"), defined by 16 bits, indicates the total number of user cells that are not empty which are transmitted before the insertion of the maintenance cell. The field BIP 16-B ("Bit Interleaved Parity") contains 16 parity bits, each of which pertain to the set of bits with the same rank as the data contained in the user cells of the block associated with the maintenance cell. Finally, a field CRC-10 defined by 10 bits is assigned to an error correcting code which pertains to the usable data in the cell.

The maintenance cells of the F5 type assigned to the virtual channels are analogous to the cells of the F4 type. However, they are not identified by a predetermined virtual channel number VCI but by a fixed value of the cell type indicator PTI.

It is already understood that the information contained in the F4 or F5 maintenance cells will make it possible to perform certain tests which will permit detection of the integrity of the transmission. Before presenting the details on this subject, it is fitting to describe the supervision apparatus that is expected to perform these tests.

Figure 3:
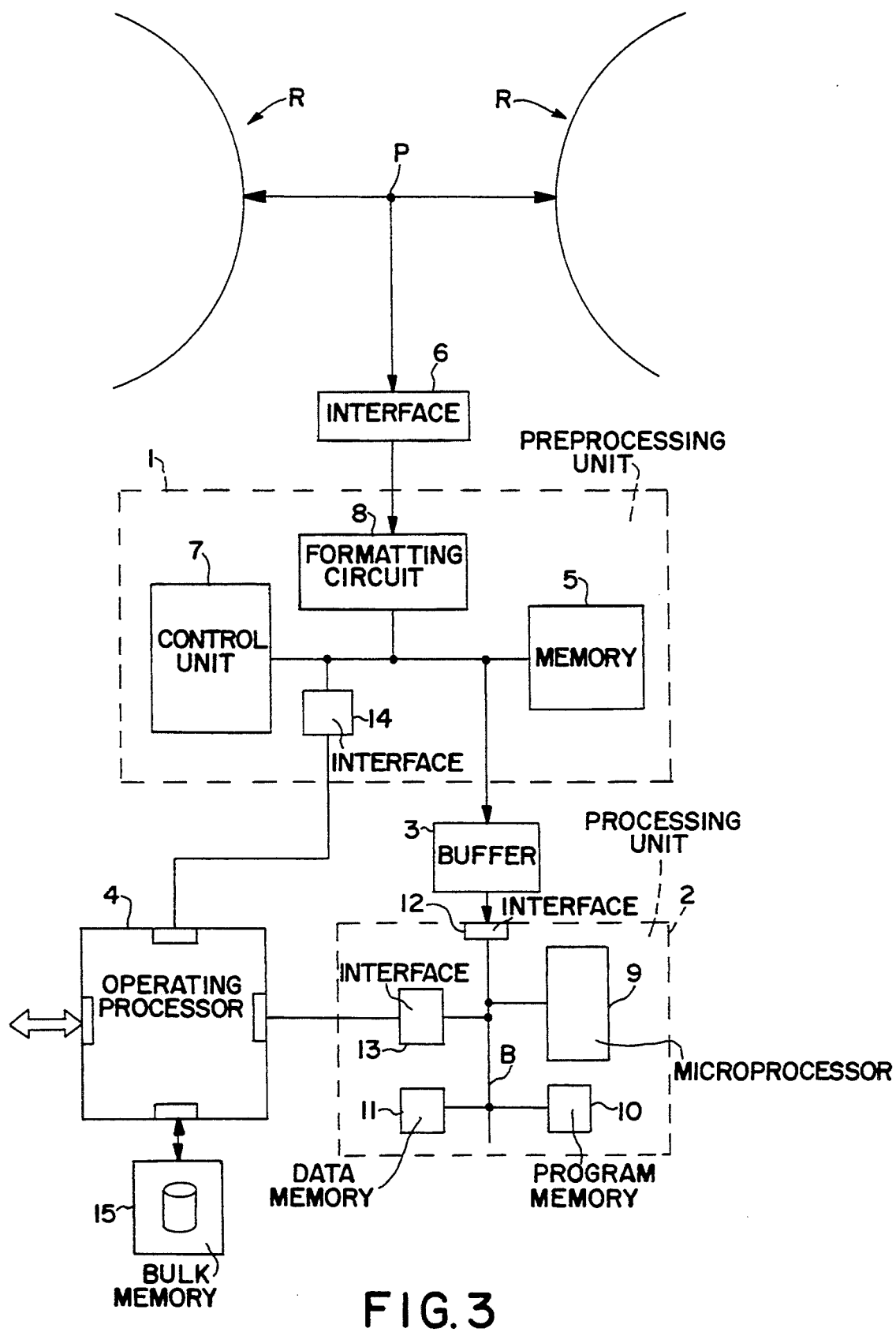
FIG. 3 represents a supervision apparatus according to the invention.

The supervision apparatus is represented in FIG. 3. It is essentially constituted of a preprocessing unit 1, a processing unit 2, and an operating processor 4. The preprocessing unit 1 is linked at a point P to the network R by an appropriate interface 6. The unit 1 comprises a programmable control unit 7, a formatting circuit 8 linked to the interface 6, and a translation memory 5. The preprocessing unit 1 communicates with the processing unit 2 by means of a buffer 3 constituted by, for example, a memory of the FIFO type.

The processing unit 2 is a conventional real-time type of microprogrammed system which essentially comprises a microprocessor 9, a program memory 10, a data memory 11, and an interface circuit 12 linked to the buffer 3. The units 9, 10, 11 and 12 communicate with one another by means of a bus B. A second interface 13 linked to the bus B allows the unit 2 to communicate with the operating processor 4.

The operating processor 4 may be a conventional microcomputer equipped with interfaces (keyboard, screen) which allow it to communicate with an operator performing the test. It will also be linked to a bulk memory 15 which is expected to memorize the results of the tests that are performed. The processor 4 is also expected to communicate with the preprocessing unit 1 by means of the interface 14. This disposition is expected to be able to modify the program of the unit 7 with a view toward performing different types of tests. It also allows the contents of the translation memory 5 to be loaded.

The operation of the apparatus in FIG. 3 will now be described. First of all, it is assumed that the control unit 7 is programmed to perform tests of the virtual paths and channels. In this case, the messages have the formats represented in Figs. 4–6.

Figure 4:
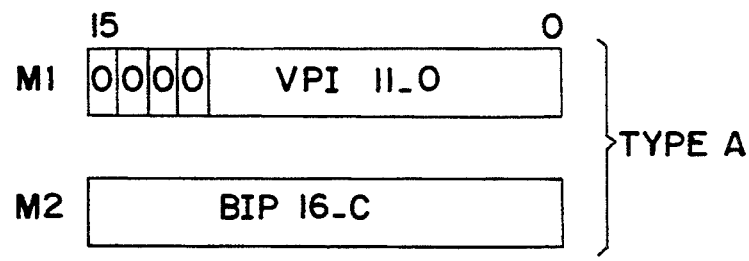
FIGS. 4–6 represent examples of formats of messages formed according to the invention.

The cells received by the interface 6 are transmitted to the formatting and justification unit 8 whose role is also to eliminate the empty cells. If the received cell is a user cell and the test pertains to the virtual paths VP, the control unit forms a message of a first type A as represented in FIG. 4. The message is constituted of a first word M1 containing the 12 bits of the virtual path number, with the 4 remaining bits set at 0. The second word M2 contains the 16 parity bits BIT16-C calculated from the data contained in the cell. The message is then loaded into the FIFO memory 3 with a view to a subsequent processing in the unit 2.

Figure 5:
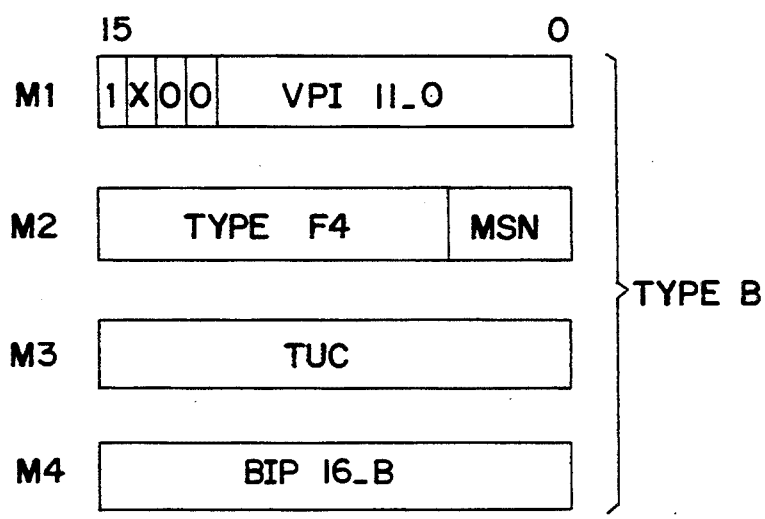

When the received cell is an F4-type maintenance cell, the message is a type B message according to the format represented in FIG. 5. A first word M1 contains the virtual path number VPI in 12 bits. Bit 15 of the word M1 is set at 1 in order to indicate that it relates to a message associated with a maintenance cell. Bit 14 takes a value X equal to 0 or to 1 depending on whether or not the error correction code CRC-10 contained in the F4 cell conforms to the error correction code that has been recalculated from the data contained in the cell.

A second word M2 contains the sequence number MSN as well as an indication of the type of F4 cell (in the case where several types have been provided for). The third word M3 contains the value of the total number of user cells TUC, and the word M4 contains the set of parity bits BIP 16-B. The type B message thus formed is then loaded into the buffer 3.

Figure 6:
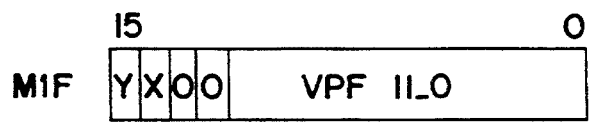

In the case where the test must pertain to the virtual channels VC, it is fitting to reduce the number of messages which must be processed by the unit 2. For that purpose, the translation memory 5, which will be addressed for the fields VPI and VCI that are contained in the headers of the (user or maintenance) cells, is used. The memory 5 supplies a number for the fictive virtual path VPF which represents a virtual channel and path selected for the test. If the virtual channel and path are not selected, it supplies a specific value which indicates this. The memory 5 will advantageously be able to form the first word M1 of the message directly. For that purpose, it will be addressed by the first 4 bytes of the header of the cell and will supply at its output the word M1F, as represented in FIG. 6. This word will then contain the 12 bits of the fictive virtual path number VPF 11-0 as well as bit 15 whose value Y will be equal to 0 or to 1 depending on whether the header belongs to a user cell or to a maintenance cell. In the latter case, bit 14 takes on a value X equal to 0 or to 1 according to the rule already stated in the description of the type B messages.

The messages thus formed are then processed by the unit 2. For example, in the case of a test of the virtual paths VP, the unit 2 associates each virtual path with a memory space reserved for a context in the form of a report which makes it possible to verify the coherence of the check information contained in the maintenance cells. This context is updated in real time, as soon as the messages are received. For example, a first word in the context will contain a cumulative total of the BIP 16-C fields in the type A messages. At the end of the cell block, this total would have to correspond to the BIP 16-B field of the maintenance cell associated with the block. Another word will contain, for example, the number of erroneous CRC-10s (detected by bit 14 of the word M1 in the type B messages).

In the case of the tests of the virtual channels VC, the operation of the unit 2 is similar, except that the stored contexts relate to the fictive virtual paths corresponding to the pairs of virtual channels and paths selected by means of the translation memory 5. The memory assigns a corresponding predetermined value, for example 0, to the channels and paths that are not selected, in which case no message is formed.

It must be noted that the translation memory could be used in a manner analogous to the case of tests of the virtual paths if it is also desirable to reduce the number of contexts. This possibility could be adopted with a view toward using a processing unit 2 with low power.

Due to the programming capabilities of the control unit 7 and the translation memory 5, the equipment which has just been presented allows other types of tests to be performed. For example, the communication protocols between an ATM network and another type of network can be verified. These protocols define an ATM adaptation layer called AAL (ATM Adaptation Layer"). The AAL protocol uses specific cells associated with predetermined virtual channels and paths, and these cells contain check information for the protocols. As with the tests of the virtual channels, the translation memory could be used with a view toward reducing the number of contexts managed by the processing unit 2. Likewise the control unit 7, which has been suitably programmed for this type of testing, will be able to form messages containing only the information that is useful for the test and the for the validation of the protocols.

We claim:

1. Process for monitoring and/or testing of a telecommunications network which conveys information in the form of conveyed cells which conform to an Asynchronous Transfer Mode (ATM) standard or an analogous standard, said conveyed cells comprising a header for differentiating between user cells and maintenance cells, with check information being created by a transmitter and being transmitted in user cells and/or maintenance cells that have been sent, said process comprising:
   reading conveyed cells at a point (P) in a network (R), and
   executing a preprocessing procedure on said conveyed cells, regardless of whether said conveyed cells are user or maintenance cells, said preprocessing procedure, including:
   reformatting the conveyed cells that have been read,
   selecting conveyed cells that are useful for executing predetermined testing operations, and
   recalculating at least a portion of the check information, and arranging recalculated check information and received check information into messages, and processing said messages in order to verify coherence between the recalculated check information and the received check information.

2. Process according to claim 1, wherein if check information is contained in the maintenance cells, said messages are either of a first type (A) in order to contain recalculated check information, or of a second type (B) in order to contain the check information from the maintenance cells, said messages of the second type (B) containing an indicator which enables them to be recognized as messages relating to the maintenance cells.

3. Process according to claim 1, wherein in said conveyed cells containing a virtual path number (VPI) identifying a virtual path (VP), said messages contain said virtual path numbers (VPI), and further wherein said step of processing said messages includes associating each virtual path (VP) with a context in the form of a report which enables verification of said coherence of the check information associated with said virtual path (VP).

4. Process according to claim 1, wherein in said conveyed cells containing a virtual path number (VPI) and a virtual channel number (VCI), said step of selecting conveyed cells includes associating fictive virtual path (VPF) numbers with certain predetermined virtual paths and channels, and further wherein said messages contain said fictive virtual path (VPF) numbers, said step of processing said messages includes associating each fictive virtual path (VPF) with a context in the form of a report which enables verification of said coherence of the check information associated with said fictive virtual path (VPF).

5. Process according to claim 1, wherein said steps of selecting conveyed cells comprises eliminating cells which contain no information.

6. Process according to claim 3, wherein said check information includes a group of parity bits (BIP) calculated from data contained in a set of user cells that have been sent.

7. Apparatus for monitoring and/or testing of a telecommunications network which conveys information in the form of conveyed cells which conform to an Asynchronous Transfer Mode (ATM) standard, said conveyed cells comprise a header for differentiating between user cells and maintenance cells (F4, F5), with check information being created by a transmitter and being transmitted in said user cells and/or said maintenance cells (F4, F5), said apparatus comprising:

a preprocessing unit (1) for preprocessing said conveyed cells, including user cells and maintenance cells, said preprocessing unit being operable to receive said conveyed cells at a point (P) in the network (R), to reformat the received cells, to select cells that are useful for executing testing operations, to recalculate at least a portion of the check information, and to form messages containing the recalculated check information and the received check information, said preprocessing unit being operable to communicate with a processing unit (2) and to transmit said messages thereto.

8. Apparatus according to claim 7, wherein if check information is contained in the maintenance cells (F4, F5) the preprocessing unit forms messages of a first type (A) to contain the recalculated check information and messages of a second type (B) which contain the information received from said maintenance cells, said messages of the second type (B) containing an indicator which enables them to be recognized as messages which relate to the maintenance cells.

9. Apparatus according to claim 7, wherein in said conveyed cells containing an indication of virtual path numbers (VPI) identifying a virtual path (VP), said messages contain said virtual path numbers (VPI), and further wherein the processing unit (1) is a unit programmed so as to associate each virtual path (VP) with a memory space associated with said processing unit (2) and allocated to a context in the form of a report which enables verification of the coherence between the recalculated check information and the check information contained in the cells belonging to said virtual path (VP).

10. Apparatus according to claim 7, wherein said conveyed cells contain an indication of a virtual path number (VPI) and a virtual channel number (VCI), and the preprocessing unit (1) comprises a translation memory (5) which is addressable as a function of the values of the received virtual channel and path numbers (VCI, VPI) and which supplies each pair of virtual channel and path values with either a word representing a cell that has not been selected, or a word containing a value of a fictive path number (VPF) that corresponds to said pair of values, and that the processing unit (2) is a unit programmed so as to associate each fictive virtual path (VPF) with a memory space associated with said processing unit (2) and allocated to a context in the form of a report which enables verification of the coherence between the recalculated check information and the check information contained in the cells belonging to said fictive virtual path (VPF).

11. Apparatus according to claim 10, characterized in that said translation memory (5) is also addressed by the header of said cells, said header including a word containing an indication of maintenance when the header is a header of a maintenance cell (F4, F5).

12. Apparatus according to claim 10, further comprising an operating processor (4) connected with said processing unit (2), said translation memory (5) being modifiable by said operating processor (4).

13. Apparatus according to claim 11, further comprising an operating processor (4) connected with said processing unit (2), said translation memory (5) being modifiable by said operating processor (4).

14. Process according to claim 2, wherein in said conveyed cells containing a virtual path number (VPI) identifying a virtual path (VP), said messages contain said virtual path numbers (VPI), and further wherein said step of processing said messages associates each virtual path (VP) with a context in the form of a report which enables verification of said coherence of the check information associated with said virtual path (VP).

15. Process according to claim 2, wherein in said conveyed cells containing a virtual path number (VPI) and a virtual channel number (VCI), said step of selecting conveyed cells includes associating fictive virtual path (VPF) numbers with certain predetermined virtual paths and channels, and that said messages contain said fictive virtual path (VPF) numbers, and further wherein said step of processing said messages includes associating each fictive virtual path (VPF) with a context in the form of a report which enables verification of said coherence of the check information associated with said fictive virtual path (VPF).

16. Process according to claim 2, wherein said selection of cells comprises eliminating cells which contain no information.

17. Process according to claim 2, wherein said check information includes a group of parity bits (BIP) calculated from data contained in a set of user cells that have been sent.

* * * * *